US010934030B2

(12) United States Patent
Watts et al.

(10) Patent No.: US 10,934,030 B2
(45) Date of Patent: Mar. 2, 2021

(54) ROCKET PROPELLANT MIXING AND FUELING SYSTEMS AND METHODS

(71) Applicant: The Boeing Company, Chicago, IL (US)

(72) Inventors: Daniel A. Watts, Surfside, CA (US); David S. Jenkins, Huntington Beach, CA (US)

(73) Assignee: The Boeing Company, Chicago, IL (US)

(*) Notice: Subject to any disclaimer, the term of this patent is extended or adjusted under 35 U.S.C. 154(b) by 778 days.

(21) Appl. No.: 15/216,129

(22) Filed: Jul. 21, 2016

(65) Prior Publication Data
US 2018/0023512 A1 Jan. 25, 2018

(51) Int. Cl.
B64G 5/00 (2006.01)
F02K 9/42 (2006.01)
F02K 9/00 (2006.01)
F02K 9/97 (2006.01)
B64G 1/40 (2006.01)
F02K 9/62 (2006.01)
F02K 9/52 (2006.01)
(Continued)

(52) U.S. Cl.
CPC ............ B64G 5/00 (2013.01); B64G 1/401 (2013.01); B64G 1/402 (2013.01); F02K 9/00 (2013.01); F02K 9/52 (2013.01); F02K 9/566 (2013.01); F02K 9/62 (2013.01); F02K 9/64 (2013.01); F02K 9/972 (2013.01)

(58) Field of Classification Search
CPC ... F02K 9/62; F02K 9/64; F02K 9/972; F02K 9/42; B64G 1/401; B64G 1/402; B64G 5/00
See application file for complete search history.

(56) References Cited

U.S. PATENT DOCUMENTS 2,959,023 A    11/1960  John
3,122,891 A *  3/1964  Thomas ................. B64G 5/00
                                                  165/169

(Continued)

OTHER PUBLICATIONS

Dumoulin, Jim, Launch Control Center, Information content from the NSTS Shuttle Reference Manual, 1988 (Year: 1988).*

(Continued)

Primary Examiner — William H Rodriguez
Assistant Examiner — Kyle Robert Thomas
(74) Attorney, Agent, or Firm — McDonnell Boehnen Hulbert & Berghoff LLP

(57) ABSTRACT

A rocket fueling system includes an insulated jacket configured to removably couple to at least a portion of a rocket and form an enclosed space between the insulated jacket and the at least the portion of the rocket. The rocket fueling system also includes a cryogen inlet in the insulated jacket. The cryogen inlet is configured to receive a cryogen into an interior chamber of the insulated jacket. The rocket fueling system further includes a cryogen outlet in the insulated jacket. The cryogen outlet is configured to provide the cryogen from the interior chamber in the insulated jacket to the at least the portion of the rocket in the enclosed space. The rocket fueling system still further includes a gas outlet in the insulated jacket configured to exhaust the cryogen from the enclosed space, and a flammable gas sensor configured to detect a flammable gas at the gas outlet.

20 Claims, 7 Drawing Sheets

(51) Int. Cl.
*F02K 9/56* (2006.01)
*F02K 9/64* (2006.01)

(56) References Cited

U.S. PATENT DOCUMENTS

| | | | |
|---|---|---|---|
| 7,385,681 B2 * | 6/2008 | Ninomiya | F23N 5/24 |
| | | | 356/5.01 |
| 2003/0058130 A1 * | 3/2003 | Kramer | F42B 39/14 |
| | | | 340/870.07 |
| 2009/0133788 A1 * | 5/2009 | Mungas | C06B 47/04 |
| | | | 149/74 |
| 2011/0308231 A1 * | 12/2011 | Carpenter | F02K 9/72 |
| | | | 60/204 |
| 2017/0299120 A1 * | 10/2017 | Stachulla | F17C 3/00 |

OTHER PUBLICATIONS

European Search Report and Written Opinion for European Patent Application No. 17181944, dated Dec. 6, 2017 (6 pages).

* cited by examiner

ROCKET PROPELLANT MIXING AND FUELING SYSTEMS AND METHODS

FIELD

The present disclosure generally relates to rocket fueling systems, and more particularly to, methods and systems that provide for fueling a rocket by liquefying a gaseous rocket fuel in a fuel chamber of the rocket.

BACKGROUND

Unless otherwise indicated herein, the materials described in this section are not prior art to the claims and are not admitted to be prior art by inclusion in this section.

Rockets are generally used to move payloads (e.g., satellites or astronauts) from the surface of the Earth to a desired orbit or trajectory. In some instances, a rocket can launch a payload to orbit in outer space. In other instances, the rocket can move the payload in a suborbital manner from one location to another. To deliver the payload to the intended destination, a rocket has a rocket engine that utilizes a rocket fuel to propel the rocket through the atmosphere and/or space. The rocket fuel is contained within the rocket throughout travel and, thus, the rocket must be fueled prior to launch. Fueling a rocket can be a potentially time consuming and costly process.

For example, using existing techniques, it can take a relatively long time to fuel a rocket with a liquid rocket fuel because, after the rocket is moved to a launch site, the rocket must be cooled to a temperature suitable for receiving the liquid rocket fuel (i.e., below a boiling point of the rocket fuel). Additionally, for example, existing techniques for fueling a rocket with a liquid rocket fuel generally involve storing relatively large quantities of highly combustible rocket fuel in temperature controlled environments for extended periods of time.

SUMMARY

A method and system for fueling a rocket is disclosed. In an example, a rocket fueling system includes an insulated jacket configured to removably couple to at least a portion of a rocket and form an enclosed space between the insulated jacket and the at least the portion of the rocket. The rocket fueling system also includes a cryogen inlet in the insulated jacket. The cryogen inlet is configured to receive a cryogen into an interior chamber of the insulated jacket. The rocket fueling system further includes a cryogen outlet in the insulated jacket. The cryogen outlet is configured to provide the cryogen from the interior chamber in the insulated jacket to the at least the portion of the rocket in the enclosed space. The rocket fueling system still further includes a gas outlet in the insulated jacket configured to exhaust the cryogen from the enclosed space, and a gas sensor configured to detect a flammable gas at the gas outlet.

In another example, a method of fueling a rocket includes coupling an insulated jacket to an exterior surface of the rocket, cooling the exterior surface of the rocket by transferring, via the insulated jacket, a cryogen from a cryogen source to the exterior surface of the rocket, transferring a gas mixture from an external fuel source to a fuel chamber in the rocket, and liquefying the gas mixture in the fuel chamber to form a liquid rocket fuel in the fuel chamber.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings.

DETAILED DESCRIPTION

Figure 1:
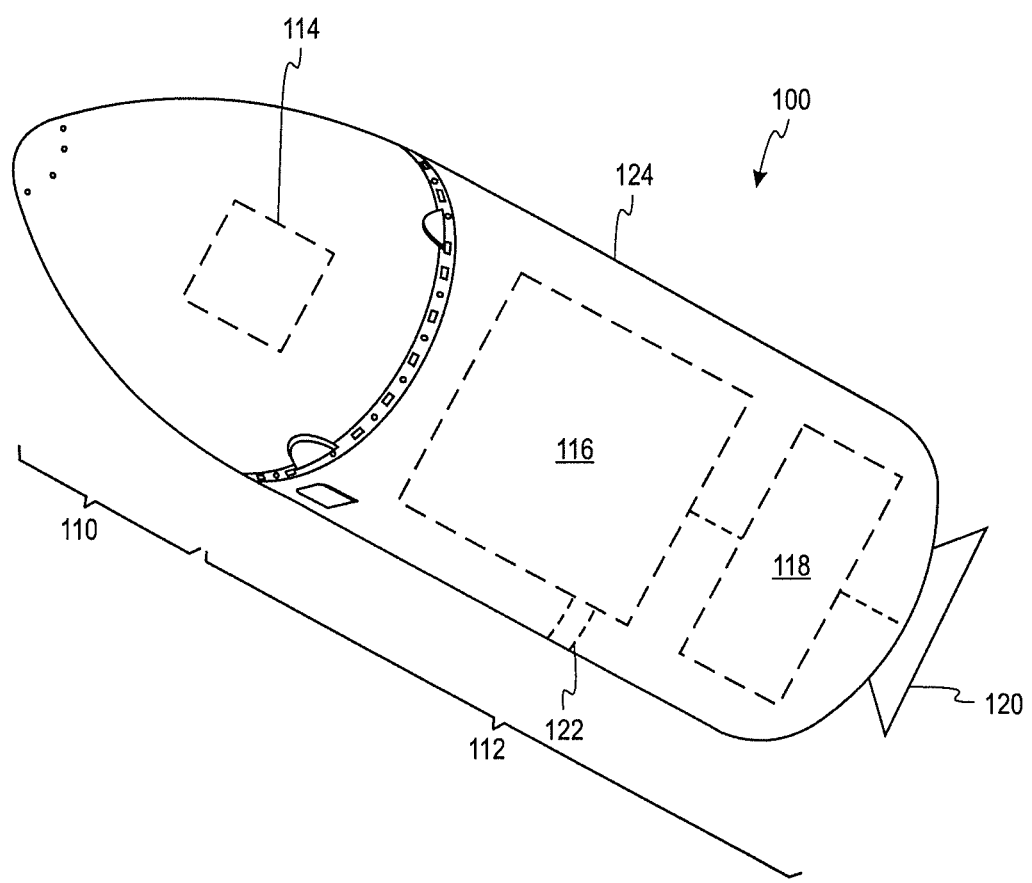
FIG. 1 depicts a perspective view of a rocket according to an example embodiment.

The disclosed methods and systems provide for fueling a rocket. FIG. 1 depicts a rocket 100 according to one example. As shown in FIG. 1, the rocket 100 includes a payload portion 110 coupled to a vehicle portion 112. The payload portion 110 can contain a payload 114 such as, for example, one or more satellites, space probes, space station components, cargo, astronauts, and/or animals, among other possibilities. In the illustrated example, the payload portion 110 of the rocket 100 is formed as a nose cone to facilitate aerodynamic performance of the rocket 100; however, the payload portion 110 can be formed with a different shape in other examples.

The vehicle portion 112 provides a rocket engine for propelling the rocket 100 during launch and/or flight. For example, the vehicle portion 112 can include one or more internal fuel chambers 116 for containing a rocket fuel (i.e., a propellant), combustion chambers 118, and/or rocket engine nozzles 120. The vehicle portion 112 can also include a fuel inlet 122 in an exterior surface 124 of the rocket 100 to facilitate transferring the rocket fuel from an external fuel source to the internal fuel chamber 116. The fuel chamber 116 is coupled to the combustion chamber 118 so that the rocket fuel can be transferred from the internal fuel chamber 116 to the combustion chamber 118. The combustion chamber 118 can combust the rocket fuel to produce a hot, high pressure gas. The combustion chamber 118 is coupled to the rocket engine nozzle 120, which exhausts the hot, high pressure gas away from the vehicle. The rocket engine nozzle 120 can facilitate accelerating the gas received from the combustion chamber 118 to facilitate converting thermal energy of the gas into kinetic energy of the rocket 100.

In addition to the features shown in FIG. 1, the rocket 100 can include additional or alternative features such as, for example, one or more navigation and/or guidance systems (e.g., a satellite navigation system and/or an inertial navigation system), and/or stabilization devices (e.g., one or more fins, Vernier engines, gimbals, and/or gyroscopes).

Figure 2:
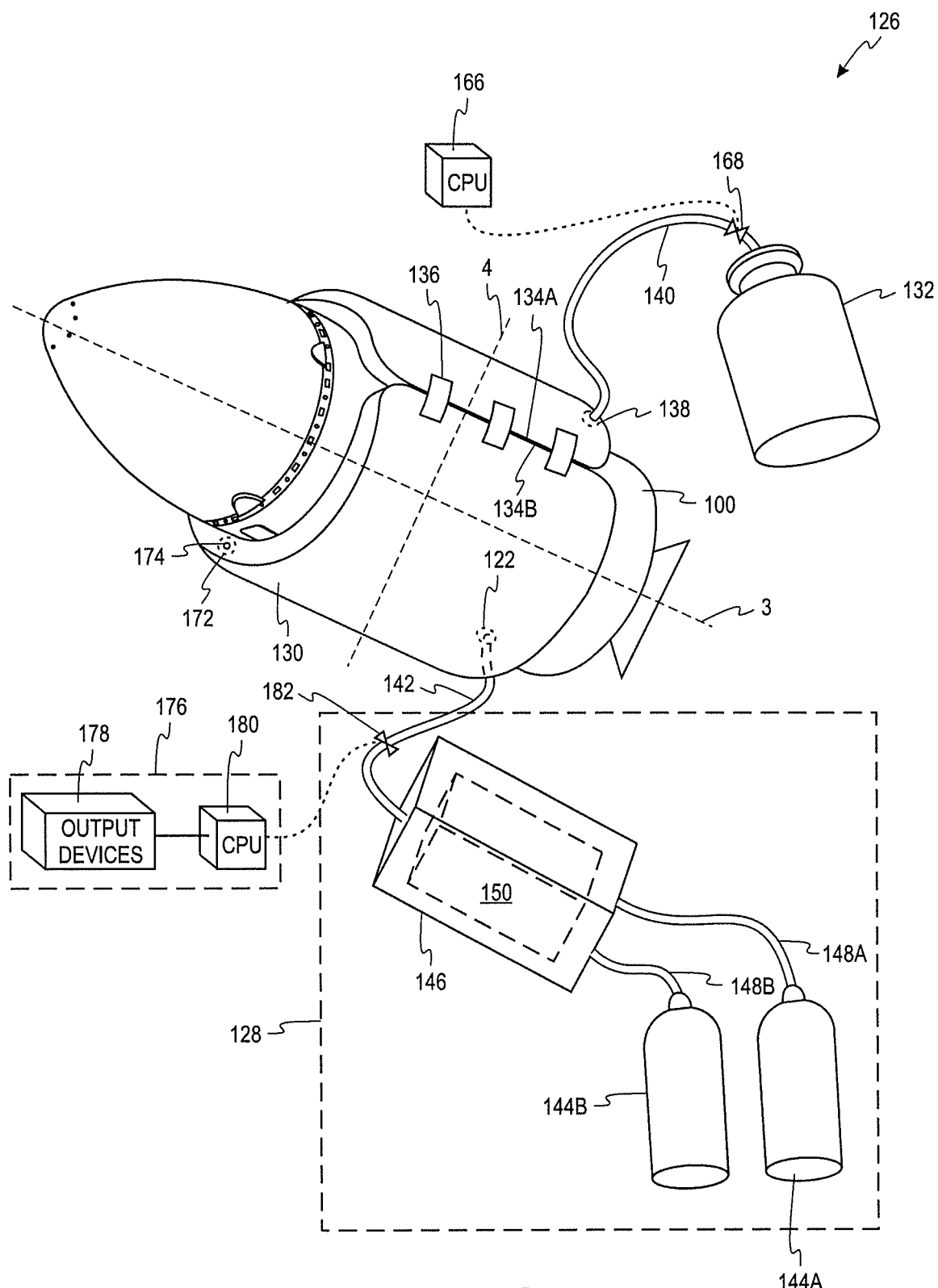
FIG. 2 depicts a perspective view of a rocket fueling system according to an example embodiment.

FIG. 2 depicts a rocket fueling system 126 according to an example of the present disclosure. The rocket fueling system 126 includes a fuel source system 128, an insulated jacket 130, and a cryogen source 132. As described in detail below, the jacket 130 couples to the rocket 100, the cryogen source 132 transfers a cryogen to the jacket 130, and the jacket 130 then disperses the cryogen over at least a portion of the rocket 100. The cryogen cools the rocket 100 to a temperature at or below a liquefaction temperature of a rocket fuel to be provided by the fuel source system 128. For example, the cryogen can cool the rocket to a temperature between approximately −20 degrees Fahrenheit to approximately −100 degrees Fahrenheit. By cooling the rocket 100 with the cryogen, the fuel source system 128 can transfer the rocket fuel to the fuel chamber 116 as a gas, which then liquefies in the fuel chamber 116 of the rocket 100. The liquefied fuel is usable by the rocket 100 as a propellant for launch and/or flight.

As shown in FIG. 2, the insulated jacket 130 is removably coupled to at least a portion of the rocket 100. In an example, the jacket 130 is made from a flexible material such as, for instance, Teflon and/or Mylar (among other possibilities). In this example, the jacket 130 can be removably coupled to the rocket 100 by wrapping the jacket 130 around the exterior surface 124 of the rocket 100 and then removably coupling opposing ends 134A, 134B of the jacket 130 to each other. For instance, the opposing ends 134A, 134B can be removably coupled to each other by a fastener 136 such as, for example, snap-fit retention features, hook-and-loop fasteners (e.g., VELCRO®), zippers, buttons, and/or straps and buckles.

In FIG. 2, the jacket 130 is coupled to the vehicle portion 112 of the rocket 100. This may beneficially allow the jacket 130 to cool the portion of the rocket 100 in which the rocket fuel is or will be contained; however, the jacket 130 can be coupled to a different portion of the rocket 100 and/or to the entire rocket 100 in other examples.

The jacket 130 includes a cryogen inlet 138 for coupling the jacket 130 to the cryogen source 132 (e.g., via a cryogen-supply conduit 140). The cryogen can include, for example, liquid nitrogen, liquid helium, liquid argon, liquid neon, and/or liquid krypton. In some examples, the cryogen can be an inert substance. This can be beneficial in that the inert cryogen is not combustible, which helps to facilitate safe fueling the rocket 100.

The fuel source system 128 is coupled to the fuel inlet 122 of rocket 100 by a fuel-supply conduit 142 to facilitate transferring a gaseous rocket fuel from the fuel source system 128 to the fuel chamber 116 in the rocket 100. The fuel source system 128 includes a plurality of gas storage containers 144A, 144B and a gas-mixing system 146. The gas storage containers 144A, 144B each store a different gas component of the rocket fuel. For example, a first container 144A can store an oxidizer gas component (e.g., nitrous oxide) and a second container 144B can store a hydrocarbon gas component (e.g., propane, ethane, or ethetalyne). The gas storage containers 144A, 144B can be, for example, conventional Department of Transportation (DOT) approved storage containers. Beneficially, storing the gas components in conventional DOT-approved storage containers allows for the rocket fuel to be transported in its component parts on public roadways, as will be further described below.

The gas storage containers 144A, 144B can be coupled to the gas-mixing system 146, for example, by respective gas conduits 148A, 148B. In this way, the gas storage containers 144A, 144B can each transfer a respective gas component to the gas-mixing system 146, and the gas-mixing system 146 can then mix the gas components in a mixing compartment 150 to form a gas mixture of rocket fuel. The gas-mixing system 146 is coupled to the fuel inlet 122 of the rocket 100 via the fuel-supply conduit 142 to facilitate transferring the gas mixture to the fuel chamber 116. In the fuel chamber 116, the gas-mixture cools and liquefies to form a liquid rocket fuel as a propellant for operation of the rocket 100.

Figure 3:
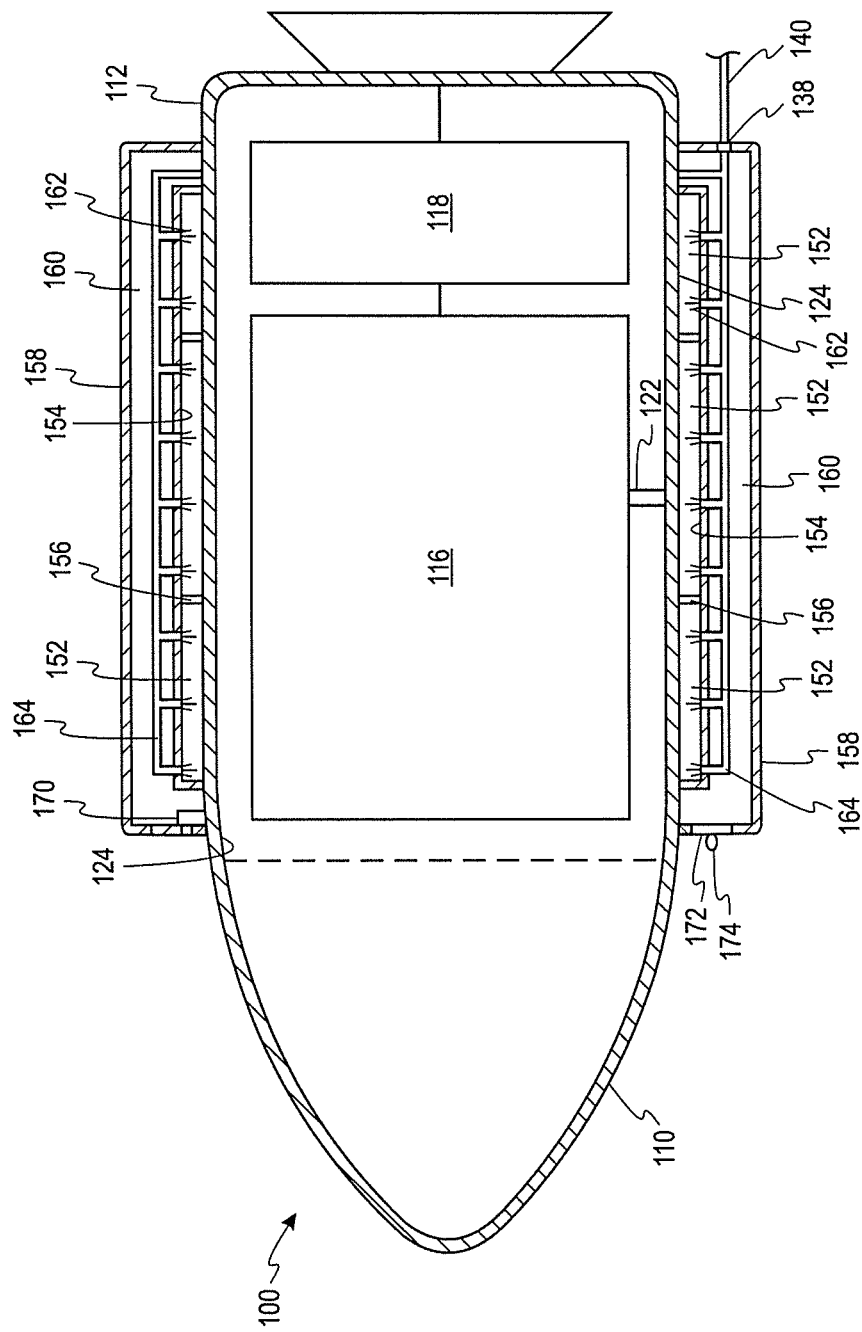
FIG. 3 depicts a cross-sectional view of the rocket and an insulated jacket of the rocket fueling system, according to an example embodiment.
Figure 4:
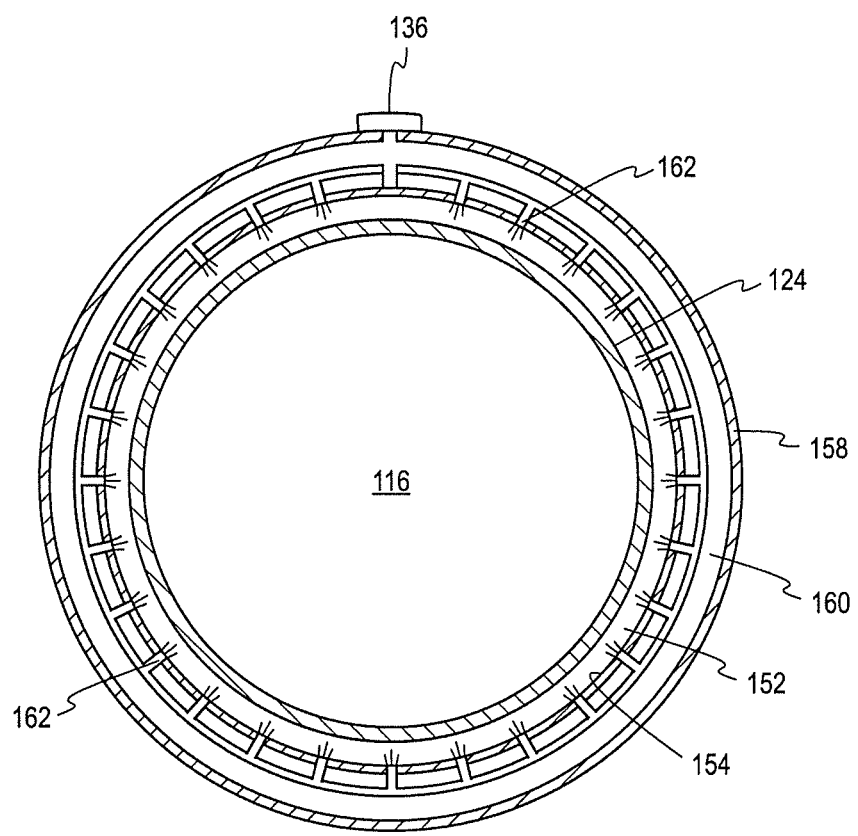
FIG. 4 depicts another cross-sectional view of the rocket and the insulated jacket of the rocket fueling system, according to an example embodiment.

In line with the discussion above, the jacket 130 receives the cryogen from the cryogen source 132, and the jacket 130 then provides the cryogen to the rocket 100 to cool the rocket to a temperature at or below the liquefaction temperature of the gas mixture. FIGS. 3-4 depict cross-sectional views of the rocket 100 and jacket 130 to further illustrate aspects of the jacket 130. In particular, FIG. 3 depicts a cross-sectional view of the rocket 100 and jacket 130 through a longitudinal axis 3 shown in FIG. 2, and FIG. 4 depicts a cross-sectional view of the rocket 100 and the jacket 130 through a circumferential axis 4 shown in FIG. 2.

As shown in FIGS. 3-4, the jacket 130 coupled to the rocket 100 forms an enclosed space 152 between the jacket 130 and the rocket 100. In particular, the enclosed space 152 is formed between an inner surface 154 of the jacket 130 and the exterior surface 124 of the rocket 100. To help maintain a gap between the inner surface 154 of the jacket 130 and the exterior surface 124 of the rocket 100, the jacket 130 can include one or more spacers 156 extending from the inner surface 154 toward the exterior surface 124 of the rocket 100. Maintaining a gap between the inner surface 154 of the jacket 130 and the exterior surface 124 of the rocket 100 can beneficially help to disperse the cryogen over a greater surface area of the rocket 100.

The jacket 130 further includes an outer surface 158. The inner surface 154 and/or the outer surface 158 of the jacket 130 can be made from an insulating material such as, for example polyurethane and/or Mylar. Forming the jacket 130 from an insulating material can improve controlling the temperature of the rocket 100 and enhance cooling efficiency. Additionally, the insulating material of the jacket 130 can help to keep most air out of the enclosed space 152 and thereby inhibit (or prevent) ice formation on the rocket 100.

As further shown in FIGS. 3-4, the inner surface 154 and the outer surface 158 define an interior chamber 160 in the jacket 130. The cryogen inlet 138 couples the cryogen-supply conduit 140 to the interior chamber 160. The cryogen inlet 138 thus facilitates receiving the cryogen from the cryogen source 132 into the interior chamber 160 of the jacket 130. The interior chamber 160 transfers the cryogen to one or more cryogen outlets 162 in the inner surface 154 of the jacket 130. To improve cryogen flow in the jacket 130, the interior chamber 156 can include one or more jacket conduits 164 for directing the cryogen through the interior chamber 160 from the cryogen inlet 138 to the cryogen outlet(s) 162.

The cryogen outlet(s) 162 transfer the cryogen from the interior chamber 160 in the jacket 130 to the rocket 100 in the enclosed space 152. As shown in FIGS. 3-4, the jacket 130 includes a plurality of cryogen outlets 162 along the longitudinal axis 3 of the jacket 130 for providing the cryogen along a length of the rocket 100, and along the circumferential axis 4 of the jacket 130 for providing the cryogen around a circumference of the rocket 100. By providing a plurality of cryogen outlets 162, the jacket 130 can disperse the cryogen over a greater surface area of the exterior surface 124 of the rocket 100 so as to better cool the rocket 100. In one example, each cryogen outlet 162 can include a nozzle that sprays the cryogen onto the exterior surface 124 of the rocket 100. Spray nozzles can further help to disperse the cryogen over increased surface area of the exterior surface. As another example, each cryogen outlet 162 can be an aperture in the inner surface 154 of the jacket 130.

The rocket fueling system 126 can include a control system for controlling a flow rate of the cryogen transferred from the cryogen source 132 to the rocket 100 via the jacket 130. In one example, the control system can include a controller 166 communicatively coupled (e.g., via a wired and/or wireless connection) to the cryogen source 132, as shown in FIG. 2. The cryogen source 132 can include a valve 168 that can open and close to increase and decrease, respectively, the flow rate of cryogen. The controller 166 can be operable to transmit a control signal to the cryogen source 132 to cause the cryogen source 132 to open and close the valve 168 based on the control signal.

The control system can further include one or more temperature sensors that are operable to measure a temperature of the rocket 100. For instance, in FIG. 3, the jacket 130 includes a temperature sensor 170 coupled to the inner surface 154 of the jacket 130 that can measure a temperature at the exterior surface 124 of the rocket 100. The temperature sensor 170 is communicatively coupled to the controller 166 (e.g., via wired and/or wireless connection) and operable to transmit to the controller 166 a temperature signal indicating the measured temperature. Based on the received temperature signal, the controller 166 can transmit a control signal to the cryogen source 132. The temperature sensor 170, the controller 166, and the cryogen source 132 can thus provide a closed-loop feedback control system for adjustably controlling the flow rate of cryogen provided to the rocket 100.

In one example, the controller 166 can process the temperature signal by comparing the measured temperature to one or more threshold values and, based on the comparison, transmit the control signal to the cryogen source 132. For instance, the threshold value can be the liquefaction temperature of the rocket fuel. If the controller 166 determines that the measured temperature is above the threshold value, the controller 166 can cause the cryogen source 132 to increase the flow rate of cryogen. Whereas, if the controller 166 determines that the measured temperature is below the threshold value, the controller 166 can cause the cryogen source 132 to decrease the flow rate of cryogen.

The controller 166 can be implemented using hardware, software, and/or firmware. For example, controller 166 can include one or more processors and a non-transitory computer readable medium (e.g., volatile and/or non-volatile memory) that stores machine language instructions or other executable instructions. The instructions, when executed by the one or more processors, may cause controller 166 to carry out the various operations of the rocket fueling system 126 described herein.

After the cryogen is transferred from the jacket 130 to the rocket 100, the cryogen may accumulate in the form of a gas within the enclosed space 152. For example, a liquid cryogen may boil and become a cryogen gas in response to contact with the exterior surface 124 of the rocket 100. The jacket 130 can include a gas outlet 172 for exhausting the cryogen gas from the enclosed space 152 to an external environment. The gas outlet 172 can thus help to reduce or eliminate pressure build-up within the enclosed space 152.

As shown in FIGS. 2-3, the jacket 130 can enclose the fuel inlet 122 in the enclosed space 152. To do so, the jacket 130 can be configured to provide access for the fuel-supply conduit 142 to the fuel inlet 122. For example, the jacket 130 can have an aperture (not shown) through which the fuel-supply conduit 142 can pass to reach the fuel inlet 122. If the fuel-supply conduit 142 is not fully coupled to the fuel inlet 122 or if the fuel-supply conduit 142 has a leak, a portion of the gaseous rocket fuel may leak into the enclosed space 152 instead of transfer to the fuel chamber 116. Because the rocket fuel is a flammable gas, a rocket fuel leak can present significant safety issues if not mitigated promptly.

In an example, the rocket fueling system 126 can detect and assist in mitigating a rocket fuel leak. For instance, the rocket fueling system 126 can include a gas sensor 174, which can detect the presence of a flammable gas such as the rocket fuel used to fuel the rocket 100. In FIGS. 2-3, the gas sensor 174 is at the gas outlet 172; however the gas sensor 174 can be coupled to the other features of the jacket 130 in other examples. Responsive to the gas sensor 174 detecting the flammable gas exhausting through the gas outlet 172, the gas sensor 174 can provide an alarm signal to an alarm system 176 (shown in FIG. 2). The alarm system 176 can include one or more output devices 178 that provide at least one of a visual alarm or an audio alarm responsive to the alarm signal. For example, the output device(s) 178 can include one or more indicator lights, display devices, speakers, and/or sirens that can notify an operator that a flammable gas has been detected by the gas sensor 174. When notified of the detected flammable gas, the operator can then terminate the flow of the gas mixture from the fuel source system 128 to the fuel chamber 116 in the rocket 100.

In another example, the gas sensor 174 can transmit the alarm signal to a controller 180 of the alarm system 176. Responsive to the alarm signal, the controller 180 can transmit a control signal to the fuel source system 128 to cause fuel source system 128 to terminate transferring the fuel chamber 116 in the rocket 100. For example, the fuel source system 128 can include a valve 182 that can open and close responsive to the control signal from the controller 180 to increase and decrease, respectively, the flow of the gas mixture from the fuel source system 128 to the rocket 100. As such, the alarm system 176 can be operable to automatically terminate the flow of the rocket fuel to assist in mitigating potentially unsafe conditions due to a rocket fuel leak.

In operation, the jacket 130 can be coupled to at least a portion of the rocket 100, and the cryogen source 132 can be coupled to the jacket 130. The cryogen source 132 can be coupled to the jacket 130, for example, by coupling the cryogen-supply conduit 140 to the cryogen inlet 138 of the jacket 130. The cryogen source 132 can then transfer the cryogen to the internal chamber 116 of the jacket 130. In the interior chamber 160 of the jacket 130, the cryogen flows from the cryogen inlet 138 to the cryogen outlets 162. The cryogen outlets 162 transfer the cryogen from the internal chamber 116 of the jacket 130 to the exterior surface 124 of the rocket 100 in the enclosed space 152. The cryogen cools the rocket 100, for example, to a temperature at or below a liquefaction temperature of the gaseous rocket fuel to be supplied by the fuel source system 128. After contacting the exterior surface 124 of the rocket 100, the cryogen exhausts from the enclosed space 152 as a cryogen gas to an external environment via the gas outlet 172 in the jacket 130.

After the rocket 100 is cooled by the cryogen to a predetermined temperature (e.g., the temperature at or below the liquefaction temperature of the gas mixture), the fuel source system 128 transfers the gas mixture to the fuel chamber 116 in the rocket 100. In an example, the jacket 130 and the cryogen source 132 can continue to cool the rocket 100 while the fuel source system 128 transfers the gas mixture to the fuel chamber 116. In the fuel chamber 116, the gas mixture liquefies due to the rocket 100 being cooled to the temperature at or below the liquefaction temperature of the gas mixture.

The rocket fueling systems and methods of the present disclosure can provide a number benefits relative to conventional systems and methods. For example, in a conventional system, the rocket fuel may be manufactured in large quantities and then stored as a liquid in temperature-controlled storage containers until needed to fuel a rocket. This may require specialized storage containers (e.g., including heat exchangers) and/or large temperature-controlled environments for storing containers of the liquid rocket fuel, both of which can be expensive. Additionally, storing large quantities of highly combustible rocket fuel can also present safety issues.

By contrast, the systems and methods of the present disclosure allow for producing and liquefying rocket fuel in an on-demand manner and while fueling the rocket. Because the rocket fuel can be produced on-demand while fueling the rocket, the systems and methods of the present disclosure can more efficiently allow an operator to mix only as much rocket fuel as is needed to fuel the rocket. As such, the need to store large quantities of highly combustible rocket fuel prior to fueling the rocket may be mitigated. Instead, the gas components of the rocket fuel can be stored in separate containers prior to fueling the rocket. In its component parts, the rocket fuel can be stored in containers and environments having less stringent handling requirements than those required by conventional systems. For instance, the gas components can be stored at room temperature or at ambient outdoor temperature environments. Additionally, for instance, the gas components can be stored in DOT-approved gas storage containers.

Beneficially, the systems and methods of the present disclosure can also provide for more rapid fueling of a rocket relative to conventional systems and methods. To fuel the rocket, the rocket is cooled so that the rocket fuel remains a liquid when transferred to the rocket. Conventionally, the rocket is cooled only after the rocket is transported from a storage location to a launch location or site (e.g., after positioning the rocket on a launch pad). Accordingly, the time conventionally required to fuel a rocket depends in part on the amount of time it takes to cool the rocket after the rocket has been transported to and positioned at the launch location.

The systems and methods of the present disclosure can beneficially reduce the time to fuel the rocket by initiating the cooling process before and/or while transporting the rocket from a storage location to the launch location. In some instances, the rocket may already be cooled to a predetermined temperature (e.g., the temperature at or below the liquefaction temperature of the rocket fuel) by the time the rocket is positioned on a launch pad. In this way, the systems and methods of the present disclosure can ready the rocket to receive the rocket fuel significantly faster than in conventional systems and methods.

Figure 5:
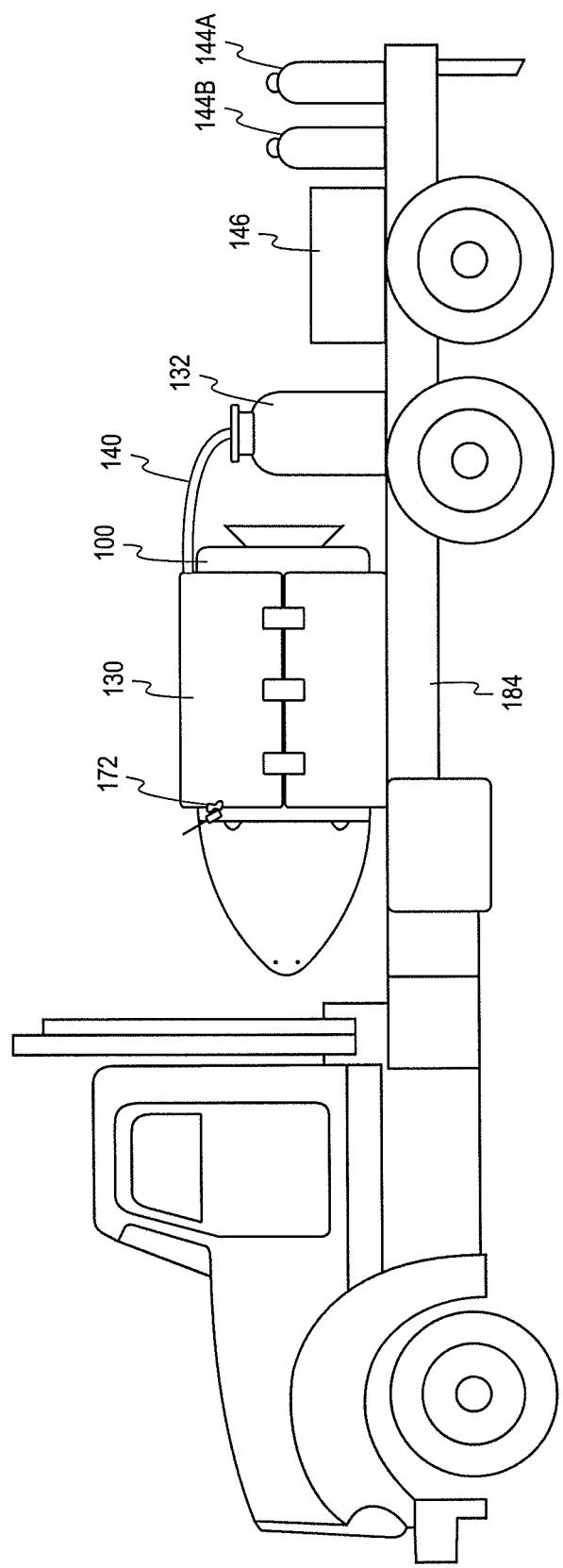
FIG. 5 depicts a side plan view of the rocket and the rocket fueling system during transport, according to an example embodiment.

As an example, FIG. 5 depicts the rocket fueling system 126 cooling the rocket 100 while a vehicle 184 transports the rocket 100 from a storage location to a launch location. As shown in FIG. 5, the rocket 100 can be cooled by the cryogen source 132 and the jacket 130 during transportation so as to prepare the rocket 100 for fueling at the launch location. By cooling the rocket 100 during transportation, the time required to fuel the rocket 100 can be reduced. For example, the rocket 100 can be cooled to the temperature at or below the liquefaction temperature of the rocket fuel during transport so that the rocket 100 is ready to receive the rocket fuel in the fuel chamber 116 shortly (or immediately) after arriving at the launch location.

As also shown in FIG. 5, the vehicle 184 can optionally transport the gas components of the rocket fuel in the gas component storage containers 148A, 148B. As described above, the gas component storage containers 148A, 148B can be DOT-approved storage containers so that the rocket fuel can be safely and cost-effectively transported on public roadways (e.g., from the storage location to the launch location).

Still further, the rocket fueling systems and methods of the present disclosure can more safely fuel a rocket than conventional systems and methods. For example, some conventional systems and methods cool the rocket on the launch site by spraying the rocket fuel itself on the exterior surface of the rocket. By contrast, in examples, the rocket can be cooled using a cryogen that is a different substance than the substances used as rocket fuel. For example, the rocket can be cooled by an inert cryogen substance that is not combustible within examples of the present disclosure. By using an inert cryogen substance to cool the rocket, the risk of first and/or explosion can be reduced.

Figure 6:
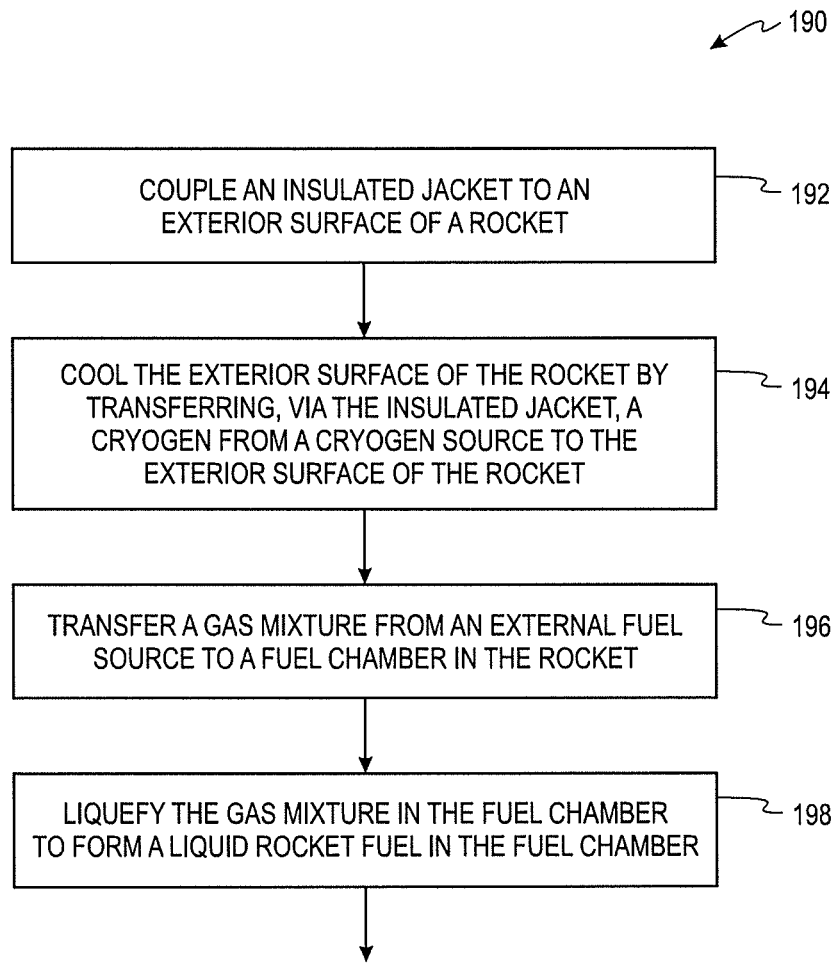
FIG. 6 depicts a flow chart of an example process for fueling a rocket, according to an example embodiment.

Referring now to FIG. 6, a flowchart is depicted for a process 190 of fueling a rocket according to one example. As shown in FIG. 6, the process begins at block 192 by coupling an insulated jacket to an exterior surface of the rocket. At block 194, the process includes cooling the exterior surface of the rocket by transferring, via the insulated jacket, a cryogen from a cryogen source to the exterior surface of the rocket. For example, the exterior surface of the rocket can be cooled to a temperature at or below a liquefaction temperature of a gas mixture to be transferred to the rocket. At block 196, the process includes transferring the gas mixture from an external fuel source to a fuel chamber in the rocket. For instance, a first gas component and a second gas component can be transferred to a mixing compartment of a gas-mixing system, the first gas component and the second gas component can be mixed in the mixing compartment to form the gas mixture, and the gas mixture can be transferred from the mixing compartment to the fuel chamber in the rocket. In one implementation, mixing the gas components and transferring the gas mixture can be performed simultaneously. At block 198, the process includes liquefying the gas mixture in the fuel chamber to form a liquid rocket fuel in the fuel chamber.

Figure 7:
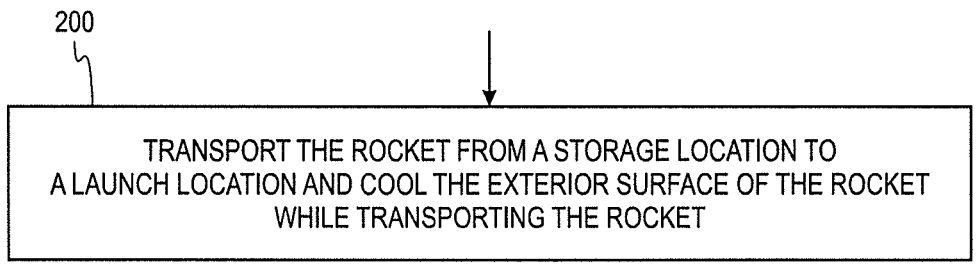
FIG. 7 depicts a flow chart of another example process for fueling a rocket, according to an example embodiment.
Figure 8:
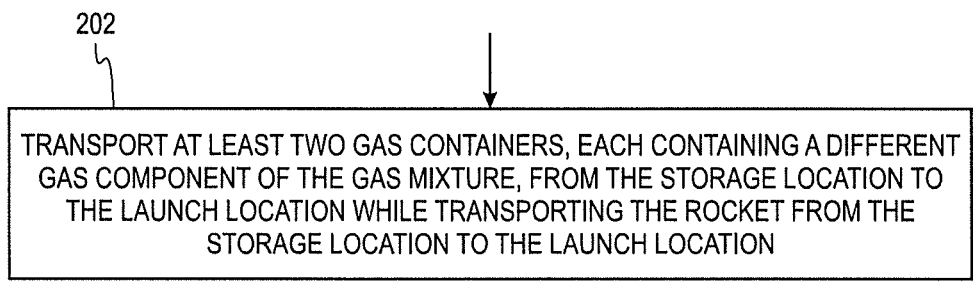
FIG. 8 depicts a flow chart of another example process for fueling a rocket, according to an example embodiment.
Figure 9:
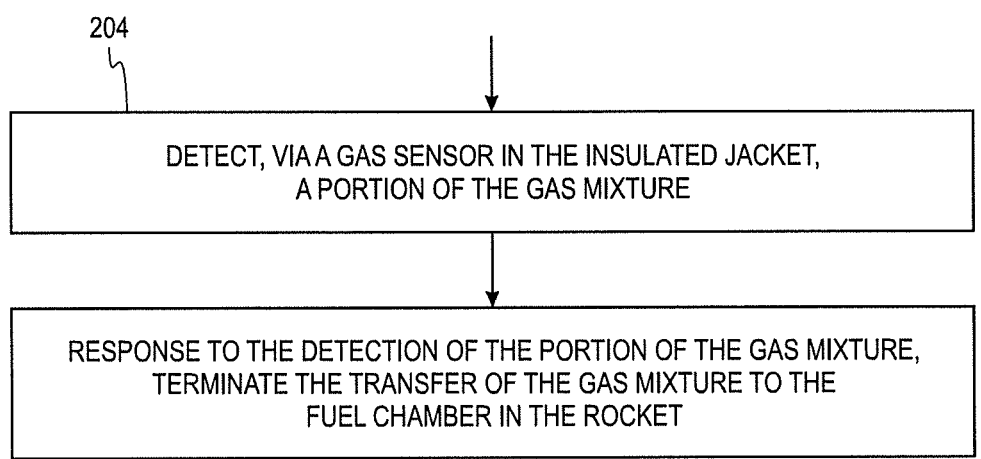
FIG. 9 depicts a flow chart of another example process for fueling a rocket, according to an example embodiment.

FIGS. 7-9 depicts additional aspects of the process 190 according to further examples. As shown in FIG. 7, at block 200, the process 190 further includes transporting rocket from a storage location to a launch location and cooling the exterior surface of the rocket while transporting the rocket. As shown in FIG. 8, at block 202, the process 190 can also include transporting at least two gas containers, each containing a different gas component of the gas mixture, from the storage location to the launch location while transporting the rocket from the storage location to the launch location at block 200. As shown in FIG. 9, the process 190 can include detecting, via a gas sensor in the insulated jacket, a portion of the gas mixture at block 204. At block 206, responsive to detecting the portion of the gas mixture, the process 190 includes terminating transferring the gas mixture to the fuel chamber in the rocket.

Example aspects have been described above. After studying the configurations, examples, and arrangements described herein a skilled person may come to understand, however, that changes and modifications may be made without departing from the true scope and spirit of the disclosure. The description of the different advantageous aspects has been presented for purposes of illustration and description, and is not intended to be exhaustive or limited to the form disclosed. After reviewing this disclosure, many modifications and variations will become apparent to those of ordinary skill in the art. Further, different advantageous aspects may provide different advantages as compared to other advantageous aspects. The example aspects selected are chosen and described in order to explain the principles of the disclosure, the practical application, and to enable others of ordinary skill in the art to understand the disclosure with various modifications as are suited to the particular use contemplated.

What is claimed is:

1. A rocket fueling system comprising:
   an insulated jacket configured to removably couple to at least a portion of a rocket and form an enclosed space between the insulated jacket and the at least the portion of the rocket;
   a cryogen inlet in the insulated jacket, wherein the cryogen inlet is configured to receive a cryogen into an interior chamber of the insulated jacket;
   a cryogen outlet in the insulated jacket, wherein the cryogen outlet is configured to provide the cryogen from the interior chamber in the insulated jacket to the at least the portion of the rocket in the enclosed space;
   a gas outlet in the insulated jacket configured to exhaust the cryogen from the enclosed space;
   a gas sensor configured to detect a flammable gas at the gas outlet;
   a plurality of gas containers configured to store a plurality of respective gas components;
   a gas-mixing system coupled to the plurality of gas containers, wherein the gas-mixing system is configured to mix the plurality of gas components to form a gas mixture;
   a fuel-supply conduit for transferring a flow of the gas mixture from the gas-mixing system to the rocket, wherein the gas-mixing system and the fuel-supply conduit are configured to operate simultaneously;
   a first controller communicatively coupled to the gas sensor and gas-mixing system, wherein the first controller is configured to increase or decrease the flow of the gas mixture from the gas-mixing system to the rocket; and
   an alarm system coupled to the gas sensor, wherein the alarm system is configured to cause, in response to the gas sensor detecting the flammable gas at the gas outlet, the first controller to terminate the flow of the gas mixture from the gas-mixing system to the rocket.

2. The rocket fueling system of claim 1, wherein the cryogen is configured to cool the rocket to a temperature that is less than a liquefaction temperature of a gaseous fuel for the rocket.

3. The rocket fueling system of claim 2, wherein the cryogen outlet comprises a plurality of cryogen outlets along a longitudinal axis of the insulated jacket for providing the cryogen along a length of the at least the portion of the rocket.

4. The rocket fueling system of claim 3, wherein the plurality of cryogen outlets are along a circumferential axis of the insulated jacket for providing the cryogen around a circumference of the at least the portion of the rocket.

5. The rocket fueling system of claim 1, wherein the insulated jacket includes a conduit for directing the cryogen from the cryogen inlet to the cryogen outlet.

6. The rocket fueling system of claim 1, wherein the alarm system is configured to generate at least one of a visual alarm or an audio alarm in response to the gas sensor detecting the flammable gas at the gas outlet.

7. The rocket fueling system of claim 1, further comprising a temperature sensor coupled to the insulated jacket, wherein the temperature sensor is configured to measure a temperature of an exterior surface of the at least the portion of the rocket.

8. The rocket fueling system of claim 7, further comprising a second controller communicatively coupled to the temperature sensor and a cryogen source, wherein the second controller is configured to control, based on the temperature measured by the temperature sensor, a flow rate of the cryogen provided from the cryogen source to the at least the portion of the rocket.

9. The rocket fueling system of claim 1, wherein the cryogen is inert.

10. The rocket fueling system of claim 1, wherein an inner surface of the insulated jacket comprises a plurality of spacers configured to form the enclosed space between the inner surface of the insulated jacket and an exterior surface of the at least the portion of the rocket.

11. The rocket fueling system of claim 1, wherein the insulated jacket comprises a flexible material, and wherein the insulated jacket is configured to removably couple to the at least the portion of the rocket by wrapping around an exterior surface of the at least the portion of the rocket.

12. A method of fueling a rocket, comprising:
    coupling an insulated jacket to an exterior surface of the rocket;
    cooling the exterior surface of the rocket by transferring, via the insulated jacket, a cryogen from a cryogen source to the exterior surface of the rocket;
    transferring a gas mixture from an external fuel source to a fuel chamber in the rocket by:
      transferring a first gas component from a first gas source to a mixing compartment of a gas-mixing system;
      transferring a second gas component from a second gas source to the mixing compartment;
      mixing the first gas component and the second gas component in the mixing compartment to form the gas mixture; and
      transferring the gas mixture from the mixing compartment to the fuel chamber in the rocket, wherein (i) mixing the first gas component and the second gas component and (ii) transferring the gas mixture are performed simultaneously;
    detecting, via a gas sensor in the insulated jacket, a portion of the gas mixture; and
    responsive to detecting the portion of the gas mixture, terminating transferring the gas mixture to the fuel chamber in the rocket; and
    liquefying the gas mixture in the fuel chamber to form a liquid rocket fuel in the fuel chamber.

13. The method of claim 12, wherein cooling the exterior surface comprises cooling the exterior surface to a temperature below a liquefaction temperature of the gas mixture.

14. The method of claim 12, wherein cooling the exterior surface of the rocket comprises cooling the exterior surface of the rocket prior to and during transferring the gas mixture to the fuel chamber.

15. The method of claim 12, further comprising transporting the rocket from a storage location to a launch location, wherein cooling the exterior surface of the rocket is performed while transporting the rocket.

16. The method of claim 15, further comprising transporting at least two gas containers, each containing a different gas component of the gas mixture, from the storage location to the launch location while transporting the rocket from the storage location to the launch location.

17. The method of claim 12, wherein cooling the exterior surface of the rocket comprises directing, via a conduit of the insulated jacket, the cryogen from a cryogen inlet in the insulated jacket to a cryogen outlet of the insulated jacket.

18. The method of claim 12, further comprising, responsive to detecting the portion of the gas mixture, generating at least one of a visual alarm or an audio alarm.

19. The method of claim 12, further comprising measuring a temperature of the exterior surface of the rocket.

20. The method of claim 19, further comprising controlling, based on the temperature of the exterior surface of the rocket, a flow rate of the cryogen provided from the cryogen source to the exterior surface of the rocket.

\* \* \* \* \*